(12) United States Patent
Lethorn et al.

(10) Patent No.: US 9,989,112 B1
(45) Date of Patent: Jun. 5, 2018

(54) CALIPER HOUSING HAVING A MASS DAMPER

(71) Applicant: AKEBONO BRAKE INDUSTRY CO., LTD, Chuo-ku, Tokyo (JP)

(72) Inventors: Brad Robert Lethorn, Northville, MI (US); Scott Alan Dubay, Clinton Township, MI (US); Keqin Xu, Farmington Hills, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days. days.

(21) Appl. No.: 15/441,992

(22) Filed: Feb. 24, 2017

(51) Int. Cl.
*F16D 65/38* (2006.01)
*F16D 65/00* (2006.01)
*F16F 7/10* (2006.01)
*F16D 55/00* (2006.01)
*F16D 55/02* (2006.01)

(52) U.S. Cl.
CPC ....... *F16D 65/005* (2013.01); *F16D 65/0018* (2013.01); *F16D 65/0068* (2013.01); *F16F 7/10* (2013.01); *F16D 55/02* (2013.01); *F16D 65/0006* (2013.01); *F16D 2055/0016* (2013.01)

(58) Field of Classification Search
CPC .... F16D 65/0018; F16D 65/0006; F16F 7/10; F16F 7/104
USPC ...................... 188/378–380, 73.37
See application file for complete search history.

(56) References Cited

U.S. PATENT DOCUMENTS

| | | | |
|---|---|---|---|
| 4,678,066 A | 7/1987 | Heintz | |
| 5,099,961 A * | 3/1992 | Dreilich | F16D 55/00 188/73.35 |
| 5,472,068 A * | 12/1995 | Weiler | F16D 55/22 188/71.1 |
| 5,746,292 A * | 5/1998 | Tanaka | F16D 55/227 188/250 E |
| 6,003,641 A | 12/1999 | Boehringer et al. | |
| 6,298,954 B1 * | 10/2001 | Weiler | F16D 55/224 188/370 |
| 8,342,489 B1 * | 1/2013 | Richardson | F16F 7/116 267/140.11 |

(Continued)

FOREIGN PATENT DOCUMENTS

| | | | |
|---|---|---|---|
| DE | 4418955 A1 * | 12/1995 | ......... F16D 65/0006 |
| DE | 19505000 A1 | 8/1996 | |

(Continued)

OTHER PUBLICATIONS

English-language abstract of DE-4418955 (no date).*

(Continued)

*Primary Examiner* — Nicholas J Lane
(74) *Attorney, Agent, or Firm* — The Dobrusin Law Firm, P.C.; Daniela M. Thompson-Walters

(57) ABSTRACT

A caliper housing having a) an inboard side; b) an outboard side distanced from the inboard side so that a rotor gap is formed between the inboard side and the outboard side; c) a bridge structure which extends from both the inboard side and the outboard side over the rotor gap and connects the inboard side with the outboard side; d) a damper bore passing through the caliper housing from the inboard side into the bridge structure; and e) a mass damper residing within the damper bore; wherein the mass damper is adapted to dampen vibrations occurring during use of the caliper housing.

20 Claims, 6 Drawing Sheets

(56) References Cited

U.S. PATENT DOCUMENTS

| | | |
|---|---|---|
| 8,511,440 B2 | 8/2013 | Kappagantu |
| 2011/0308900 A1 | 12/2011 | Drewes |
| 2014/0158483 A1 | 6/2014 | Yosuke et al. |
| 2016/0208872 A1 | 7/2016 | Morio et al. |

FOREIGN PATENT DOCUMENTS

| | | |
|---|---|---|
| DE | 10305308 A1 | 4/2004 |
| EP | 0455299 B1 | 6/1994 |
| WO | 2015/113693 A1 | 8/2015 |

OTHER PUBLICATIONS

Vibranator for Harley 1" OD Chromed Steel Handlebars 13/16" ID, eBay, http://www.ebay.com/itm/Vibranator-for-Harley-1-OD-Chromed-Steel-Handlebars-13-16-ID-/182426976255?_trksid=p2385738.m2548m14275, last accessed Mar. 14, 2017.

Vibration damper/ building / low-friction 2KS series, Direct Industry http://www.directindustry.com/prod/airpot/product-11558-362693.html, last accessed Mar. 21, 2017.

Steiger Performance Motorcycle Handlebar Vibration Damper Installation and Removal, Steiger Performance, Youtube https://www.youtube.com/watch?v=jpKHu4o80Gs, last accessed Mar. 21, 2017, Published Nov. 27, 2013 by Steiger Performance, at 0:07 seconds/1:09.

Steiger Performance Motorcycle Handlebar Vibration Damper Installation and Removal, Steiger Performance, Youtube https://www.youtube.com/watch?v=jpKHu4o80Gs , last accessed Mar. 15, 2017, Published Nov. 27, 2013 by Steiger Performance, at 0:32 seconds/1:09.

Co-Pending U.S. Appl. No. 15/399,319, filed Jan. 5, 2017.

\* cited by examiner

CALIPER HOUSING HAVING A MASS DAMPER

FIELD

The present teachings generally relate to a mass damper, which may be suitable for residing within a caliper housing of a brake assembly. The mass damper may dampen vibrations and reduce noise produced during braking while residing within an interior of a caliper housing, such as part of a bridge structure.

BACKGROUND

Disc brakes are widely used for braking applications in automobiles. A disc brake generally includes a caliper and a rotor. A style of caliper may be an opposed piston caliper. An opposed piston caliper generally includes opposing pistons within opposing piston bores facing opposing surfaces of the rotor. Typically, the opposing pistons are placed so that one or more inner pistons face an inner surface of a rotor and one or more outer pistons face an outer surface of the rotor. Upon actuation, the pistons move toward the rotor, thus squeezing brake pads against the rotor to create a braking force to either slow or stop rotation of the rotor. Although opposing pistons may be advantageous in providing a stable braking force, some opposed piston calipers may present problems with vibrations. The vibrations may result in brake squeal, which may audibly resonate within an interior of a vehicle.

Examples of attempts to reduce vibrations may be found in US2011/0308900, WO2015/113693, DE19505000, and EP0455299; all of which are expressly incorporated herein by reference for all purposes. Notwithstanding the above, there appears to be an absence of a mass damper able to reside within an interior of a caliper housing to dampen vibrations of the caliper housing.

It would be desirable to have a mass damper capable of damping vibrations occurring within a caliper housing. It would be attractive to have a mass damper capable of damping and/or preventing low frequency vibrations between 0 kHz and 14 kHz, which have a tendency to produce audible brake squeal. It would be desirable to have a mass damper residing with an interior of a caliper housing to avoid physical interference with other components (e.g., shocks, control arms, knuckles, wiring, hoses, etc.) of a vehicle outside of the caliper housing.

SUMMARY

The present disclosure relates to a caliper housing comprising: a) an inboard side; b) an outboard side distanced from the inboard side so that a rotor gap is formed between the inboard side and the outboard side; c) a bridge structure which extends from both the inboard side and the outboard side over the rotor gap and connects the inboard side with the outboard side; d) a damper bore passing through the caliper housing from the inboard side into the bridge structure; and e) a mass damper residing within the damper bore; and wherein the mass damper is adapted to dampen vibrations occurring during use of the caliper housing.

The present disclosure relates to a brake assembly comprising: a) a rotor having a rotational axis; and b) a caliper housing having: (i) an inboard side; (ii) an outboard side distanced from the inboard side so that a rotor gap is formed between the inboard side and the outboard side; (iii) a bridge structure which extends from both the inboard side and the outboard side over the rotor gap and connects the inboard side with the outboard side; (iv) a damper bore passing through the caliper housing from the inboard side into the bridge structure toward the outboard side; and (v) a mass damper residing within the damper bore, wherein the mass damper includes: a counter mass free of contact with a bore wall of the damper bore; and one or more absorption materials; and wherein the mass damper is adapted to dampen vibrations occurring during use of the caliper housing.

The present disclosure provides a mass damper which may be able to reside within a bore of a caliper housing and dampen vibrations during creation of a braking force. The mass damper may include a counter mass, which may have a suitable weight to dampen a caliper housing's natural frequency. The mass damper may be capable of damping and/or preventing low frequency vibrations between 0 kHz and 14 kHz. The mass damper may be able to at least partially or wholly reside within the caliper housing to avoid physical interference with other components of a vehicle located about an exterior of the caliper housing.

DETAILED DESCRIPTION

Figure 1:
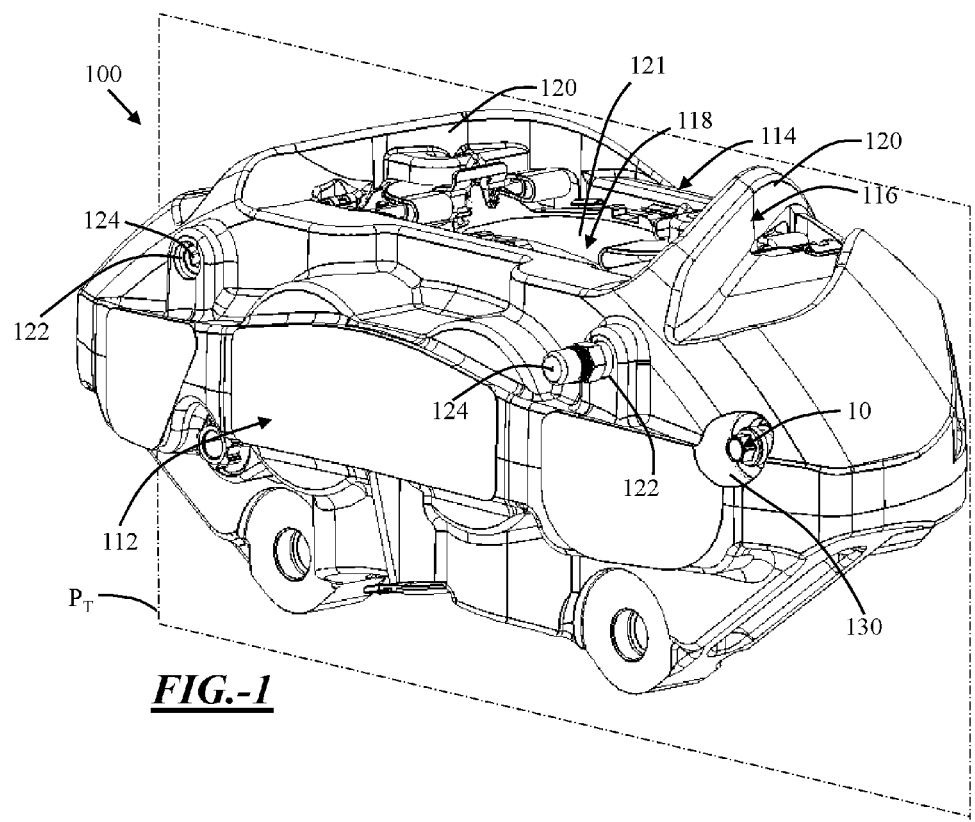
FIG. 1 is a perspective view of a caliper housing having a mass damper.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure generally relates to a mass damper. The mass damper may function to distribute mass of a vehicle component by being affixed to, residing within, and/or adding weight to the vehicle component. The mass damper may function as a counterweight by balancing inertia forces, redistributing mass, or both of a vehicle component. The mass damper may be advantageous in disrupting and/or reducing vibrations occurring within a vehicle component. A vehicle component with a mass damper may have reduced vibrations of about 30% or greater, about 50% or greater, about 60% or greater, or even about 70% or greater as compared to a vehicle component without a mass damper. A vehicle component with a mass damper may have reduced vibrations of about 100% or less, about 95% or less, or even about 90% or less as compared to a vehicle component without a mass damper. For example, a vehicle component with a mass damper may have reduced vibrations of about 70% to about 90% as compared to a vehicle without a mass damper. A frequency response function tool may be used to measure an input frequency into the vehicle component and measure an output response frequency (e.g., vibrations) of the vehicle component. The frequency response function tool may measure the output response frequency of both a vehicle component with a mass damper and without a mass damper to compare the output response frequencies. The vehicle component may be tested in a brake dynamometer, such as an NVH (noise, vibration, and harshness) brake dynamometer. The brake dynamometer may measure vibrations in the vehicle component, including brake squeal. By disrupting and/or reducing vibrations, the mass damper may prevent vibrations from transferring from the vehicle component to another component and/or resonating at an audible frequency. The mass damper may prevent vibration frequencies of the caliper housing between about 0 kHz and about 4 kHz, between about 0 kHz and about 10 kHz, or even between about 0 kHz and about 14 kHz.

A vehicle component may include any component of a vehicle subject to vibrations during use. A vehicle may include a car, truck, bus, train, airplane, motorcycle, or the like. Exemplary vehicle components may include a brake assembly, body structure, handle, a motor, or the like. A brake assembly may include a caliper housing. The mass damper may be particularly useful in reducing or preventing vibrations occurring within a caliper housing. The mass damper may be affixed to, reside within, and/or extend from a caliper housing. For example, the mass damper may be at least partially located within a damper bore of a caliper housing. A mass damper residing partially, mostly, or completely within a caliper housing may prevent the mass damper from interfering with other components surrounding a caliper housing and/or brake assembly. About 30% or more, about 40% or more, or even about 50% or more of a length of a mass damper may reside within a caliper housing. About 100% or less, about 90% or less, or even about 80% or less of a length of a mass damper may reside within a caliper housing. The mass damper may include one or more components. One or more components of the mass damper may include one or more counter masses, one or more bores, one or more isolators, one or more caps, one or more fasteners, one or more absorption materials, or any combination thereof. The mass damper may include a longitudinal axis.

One or more components of the mass damper, a damper bore, or any combination thereof may include one or more longitudinal axes. A longitudinal axis may function to define the relation of one or more components of the mass damper to one or more other components of the mass damper and/or caliper housing. A longitudinal axis may be generally perpendicular, parallel, or any angle therebetween relative to opposing surfaces of a rotor, a rotational axis of a rotor, one or more planes, one or more interior surfaces of a caliper housing, or any combination thereof. For example, a longitudinal axis may be generally parallel with a rotational axis of a rotor. A longitudinal axis may run generally across a length of a mass damper, one or more components of a mass damper, a damper bore, or any combination thereof. One or more longitudinal axes may be co-axial or off-center from one or more other longitudinal axes. For example, a longitudinal axis of a counter mass, when assembled to a mass damper, may be coaxial with a longitudinal axis of the mass damper; a longitudinal axis of a mass damper, when located within a damper bore, may be co-axial with a longitudinal axis of a damper bore; or both. A length and/or width of one or more components of a mass damper, damper bore, or both may be measured generally parallel, perpendicular, or any angle therebetween relative to one or more longitudinal axes. For example, a length of one or more components of a mass damper, damper bore, or both may be measured parallel relative to a longitudinal axis; a width of one or more components of a mass damper, damper bore, or both may be measured perpendicular relative to a longitudinal axis; or both.

The mass damper may include one or more counter masses. One or more counter masses may function to add weight to a localized region of a caliper housing, thus redistributing the mass of the caliper housing. One or more counter masses may function to disrupt vibrations of a caliper housing by vibrating, oscillating, and/or remaining static in response to vibrations of the caliper housing. A counter mass may have a shape which is generally cylindrical, conical, cubical, spherical, prismed, or any combination thereof. For example, the counter mass may have a generally hourglass and/or rod-like shape. One or more counter masses may include a longitudinal axis. The longitudinal axis may extend from one end of a counter mass to an opposing end of the counter mass. One or more counter masses may be solid, hollow, or both. One or more counter masses may be a unitary structure or a multi-piece structure. A unitary structure counter mass may include a single body portion or a plurality of body portions integral with one another. A multi-piece structure counter mass may include one or more separate body portions connected to one another. A multi-piece structure counter mass may include a plurality of absorption materials without one or more body portions. A mass of a counter mass may be about 0.5% or greater, about 0.9% or greater, about 1.25% or greater, or even about 1.5% or greater relative to the mass of a caliper housing. A mass of a counter mass may be about 11.5% or less, about 6.8% or less, about 4.5% or less, about 3.4% or less, or even about 2.75% or less relative to the mass of a caliper housing. For example, a counter mass may have a mass from about 0.5% to about 2.75% relative to the mass of a caliper housing. A mass of a counter mass may be about 25 g or greater, about 40 g or greater, about 55 g or greater, or even about 65 g or greater. A mass of a counter mass may be about 500 g or less, about 300 g or less, about 200 g or less, or even about 150 g or less. For example, a counter mass may have a mass from about 65 g to about 150 g. One or more counter masses may be affixed to, partially or fully reside within, and/or partially or fully extend outside of a caliper housing. One or more counter masses may or may not protrude beyond an exterior surface of the caliper housing. About 0% or more, about 10% or more, or even about 25% or more of a length of a counter mass may reside within an interior of a caliper housing (i.e., a damper bore). About 100% or less, about 90% or less, or even about 80% or less of a length of a counter mass may reside within an interior of a caliper housing (i.e., a damper bore). One or more counter masses may be retained to a caliper housing by one or more other components of a mass damper. One or more counter masses may include one or more body portions, one or more bores, one or more chambers, one or more absorption materials, or any combination thereof.

The counter mass may include one or more body portions. One or more body portions may function as a weight; to retain an absorption material; to cooperate with one or more other components of the mass damper to affix the mass damper to a vehicle component; to vibrate, oscillate, and/or remain static relative one or more components of a mass damper and/or caliper housing; or any combination thereof. One or more body portions may include a single or a plurality of body portions. One or more body portions may include one or more neck portions, first body portions, midsections, second body portions, ends, or any combination thereof. One or more body portions may be unitary, integral, and/or affixed to one or more other portions. For example, a neck portion may be adjacent and integral with a first body portion; a midsection may be adjacent, between, and/or integral with a first and second body portion; or both. One or more body portions may be concentric or off-center with one or more other body portions, a longitudinal axis of a mass damper, or both. One or more body portions have an exterior surface. The exterior surface has a width. The width of one or more body portions may be smaller than, equal to, or larger than a width of one or more other body portions, one or more caps, one or more absorption materials, one or more isolators, one or more damper bores or any combination thereof. For example, a neck portion and/or a midsection may be narrower than a first and/or second body portion. One or more body portions may have a width smaller than a width of a damper bore so that the counter mass is not in contact with one or more walls of the damper bore. One or more body portions may have a width smaller than one or more other body portions, so that a narrower body portion may have one or more other components of the mass damper located an exterior to affix one or more body portions to a damper bore. For example, one or more caps or one or more absorption materials may be attached within a damper bore while receiving one or more body portions therein, thus allowing the one or more body portions to be free of contact with one or more bore walls. One or more body portions may be adjacent to and/or at least partially encircled by one or more other components of the mass damper. One or more body portions may be solid, hollow, or a combination of both. One or more body portions may include one or more bores, one or more chambers, one or more absorption materials, one or more other counter masses, or any combination thereof.

One or more components of the mass damper may include one or more bores. One or more bores may function to receive at least a portion of one or more fasteners and/or one or more other components of the mass damper, cooperate with and secure one or more components of the mass damper to one or more other components of the mass damper, or both. One or more bores may include one or more fastener bores within one or more counter masses and/or isolators, one or more isolator bores within one or more caps, one or more counter mass bores within one or more absorption materials, or any combination thereof. One or more bores may be concentric or off-center with a longitudinal axis of a mass damper, a counter mass, or both. One or more bores may have any suitable length and/or width for receiving and/or engaging one or more components of the mass damper. A length and/or a width of a bore may be smaller than, equal to, or greater than a length and/or width of a shaft of a fastener, a neck portion, a counter mass, an isolator, one or more other bores or any combination thereof. One or more bores may extend from one or more ends, partially through, and/or completely through one or more components of the mass damper. For example, one or more bores may pass entirely through a length of one or more caps, isolators, and/or absorption materials. In another example, one or more bores may extend from an end of a counter mass located at a neck portion and extend at least partially through one or more other body portions. One or more bores may terminate adjacent a solid interior of one or more counter masses. One or more bores may be adjacent to and open into a hollow chamber of one or more counter masses. One or more bores may be separated from a hollow chamber of one or more counter masses by at least a portion of a solid interior of one or more counter masses. One or more bores may have a uniform width or varying widths. Varying widths may allow for inner walls of one or more bores to be in direct contact with one or more components while also being distanced from one or more other components. For example, one or more caps may include one or more bores with varying widths. A bore with a narrower width (i.e., narrower bore) may be adjacent a bore with a wider width (i.e., wider bore). A narrower bore may be an isolator bore portion. The isolator bore portion may function to interlock one or more caps with one or more isolators. The isolator bore portion may allow a portion of a cap to be located between a head portion and a tail portion. A wider bore may be a counter mass bore portion. The counter mass bore portion may have width larger than the isolator bore portion. The counter mass bore portion may allow one or more caps to be distanced from and free of contact with one or more counter masses, one or more fasteners, or both. One or more bores may have smooth walls, one or more engagement features, or both. One or more engagement features may be any suitable feature capable of engaging one or more components of a mass damper. One or more engagement features may include threads, grooves, notches, protrusions, or any combination thereof. For example, one or more bores of a counter mass may be threaded to receive and engage one or more fasteners having threads.

The counter mass may include one or more chambers. One or more chambers may function to reduce the weight of a counter mass, retain an absorption material, or both. The chamber may be any size, shape, and/or configuration to reduce the counter mass weight to a desired weight, retain an absorption material, or both. One or more chambers may have a shape which is generally cylindrical, conical, cubical, spherical, prismed, or any combination thereof. One or more chambers may be a hollow portion within an interior of one or more counter masses. One or more chambers may be a hollow portion within one or more body portions. One or more chambers may be located within and/or extend through one or more body portions of a counter mass. One or more chambers may be a singular chamber or multiple chambers. One or more chambers may be directly adjacent, open into, or separated from one or more other chambers, one or more bores, or both.

The mass damper may include one or more isolators. The one or more isolators may function to engage one or more components of the mass damper; transfer and/or prevent transfer of vibrations from one or more components of the mass damper to one or more other components, separate one or more components of the mass damper from one or more other components, or any combination thereof. One or more isolators may be comprised of one or more damper materials. The one or more damper materials may be any material suitable for preventing transfer of vibrations from the caliper housing to one or more components of the mass damper and/or vice-versa. The one or more damper materials may be compressible or incompressible. The one or more absorption materials may prevent transfer of vibrations from the caliper housing to a counter mass, from a counter mass to a caliper housing, or both. One or more isolators may have a shape which is generally cylindrical, conical, cubical, spherical, prismed, or any combination thereof. For example, one or more isolators may have a bobbin-like cylindrical shape. One or more isolators may include one or more portions. One or more portions may include a head portion, tail portion, middle portion, or any combination thereof. One or more portions may be distanced from, adjacent to, joined with, or any combination thereof relative to one or more other portions. A head portion may be distanced from a tail portion. A middle portion may be adjacent to a head portion and/or a tail portion. One or more portions may distance two or more other portions from one another. For example, a middle portion may distance a head portion from a tail portion. One or more portions may have a width less than, equal to, or greater than a width of one or more other portions of the isolator; one or more components or portions of components of the mass damper; or both. A middle portion may have a width smaller than a head portion and/or tail portion. A middle portion may have a width smaller than or about equal to one or more bores, such as an isolator bore portion. A head portion may have a width about equal to a tail portion. A width of one or more portions of an isolator may be less than, about equal to, or greater than one or more portions of adjacent components. For example, a width of a tail portion may be substantially the same as a width of a neck portion; a width of a head portion may be about equal to or greater than a width of a fastener, such as a head, to provide a surface of the fastener to abut to; or any combination thereof. When assembled as a component of a mass damper, one or more isolators may be located adjacent, in direct contact with, and/or between one or more components of the mass damper. When assembled as a component of a mass damper, one or more isolators may be at least partially surrounded or encircled by one or more other components of the mass damper. For example, one or more caps may encircle about a middle portion and/or a tail portion. When assembled as a component of a mass damper, one or more isolators may receive at least a portion of one or more other components of the mass damper. For example, one or more isolators may include on or more bores, such as a fastener bore. A fastener bore may receive one or more fasteners therethrough. When assembled as a component of a mass damper, one or more isolators may be generally concentric or off-center from one or more components of a mass damper, longitudinal axis, or both.

The mass damper may include one or more caps. One or more caps may function to retain the mass damper secured to, located within, and/or sealed inside of a bore. One or more caps may have a shape which is generally cylindrical, conical, cubical, spherical, prismed, or any combination thereof. One or more caps may have an exterior shape suitable for securing to, residing within, and/or sealing one or more damper bores. One or more caps may have a cross-sectional shape substantially similar to a cross-sectional shape of a damper bore. For example, one or more caps may be cylindrical. The cross-section may be taken generally perpendicular to a longitudinal axis of a damper bore, mass damper, or both. The cap has a width. The width of one or more caps may be smaller than, equal to, or greater than the width of one or more components of the mass damper, a damper bore, or both. The width of the one or more caps may be greater than a width of one or more components. The width of one or more caps may be greater than a width of one or more components of the mass damper to allow one or more caps to encircle all or a portion of one or more components of the mass damper; be located between one or more components of the mass damper and one or more bore walls; or both. The width of one or more caps may be suitable to allow one or more caps to interlock with a damper bore. For example, a width of a cap may be greater than a width of a damper bore so the cap forms an interference fit with one or more bore walls of the damper bore. For example, a width of a cap may be smaller than a width of a damper bore if the cap is affixed within the damper bore via a plurality of threads, an adhesive, or the like. One or more caps may have a substantially smooth exterior or include a plurality of threads about an exterior. One or more caps may include one or more bores. One or more bores may span along a portion or all of a length of one or more caps. One or more bores of a cap may receive one or more components of the mass damper therethrough. One or more bores of a cap may include an isolator bore portion, a counter mass bore portion, or both. When assembled as part of a mass damper, one or more caps may be located adjacent to, be affixed to, be in direct contact with, be distanced from, encircle at least a portion of, receive at least a portion of, be received within, be concentric with, be off-center with, or any combination thereof one or more other components of the mass damper. When assembled as part of a mass damper, one or more caps may encircle about one or more isolators and at least a portion of a counter mass. When assembled as part of a mass damper, one or more caps may be received between a head portion and a tail portion of an isolator. When assembled as a component of a mass damper, one or more caps may be affixed to one or more other components of the mass damper via one or more fasteners.

The mass damper may include one or more fasteners. One or more fasteners may function to secure one or more components of the mass damper to one another. One or more fasteners may be any fastener capable of securing one or more components of the mass damper to one or more other components. One or more fasteners may be integral with or separate from one or more other components of the mass damper. For example, one or more fasteners may be integral with one or more counter masses or separate from and affixed to one or more counter masses. One or more fasteners may include one or more mechanical fasteners, adhesive materials, molded fasteners, the like, or any combination thereof. A mechanical fastener may include a threaded fastener, a press-fit fastener, a snap-fit fastener, a staple, the like, or any combination thereof. A threaded fastener may include a screw, a bolt, a stud, a nut, or any combination thereof. An adhesive material may include an adhesive, a sealant, a tape, a material suitable for soldering, or any combination thereof. One or more fasteners may include a head, a shaft, or both. When assembled as a component of a mass damper, a shaft may be received, extend through and/or be engaged within one or more bores of one or more other components of the mass damper. The shaft may be threaded, unthreaded, or both. Threads of a shaft may engage with threads of one or more components of the mass damper. For example, a counter mass may have a threaded bore which receives and interlocks with the threads of the shaft. A head of one of one more fasteners may be located adjacent to one or more components of the mass damper. A head of one or more fasteners may cooperate with one or more components of the mass damper to compress one or more other components of the mass damper. A fastener may retain components of the mass damper assembled together via compression, interlocking engagement, or both. For example, one or more components of a mass damper may be compressed between a head of a fastener and one or more other components of the mass damper.

The mass damper may include one or more absorption materials. One or more absorption materials may include a single absorption material or a plurality of absorption materials. The absorption materials may function to prevent direct contact between one or more components of a mass damper and one or more surfaces of a caliper housing; affix one or more mass dampers to a caliper housing, retain one or more components of a mass damper, transfer and/or prevent transfer of vibrations from a caliper housing to a mass damper or vice versa, retain one or more components of a mass damper static relative to a caliper housing, or any combination thereof. One or more absorption materials may be liquid, solid, granular, or any combination thereof. One or more absorption materials may have a shape which is generally cylindrical, conical, cubical, spherical, prismed, helical, or any combination thereof. One or more absorption materials may have an exterior cross-sectional shape substantially similar to a cross-sectional shape of one or more counter masses, one or more damper bores, or both. The cross-section may be taken perpendicular to a longitudinal axis. For example, one or more absorption materials may be generally cylindrical and/or helical to be located about one or more counter masses. For example, a plurality of absorption materials may be substantially spherical and may at least partially fill an interior of a counter mass and/or a damper bore. One or more absorption materials may be compressible or incompressible. The one or more absorption materials may be comprised of or include one or more elastomeric materials and/or may include one or more springs. One or more absorption materials may include one or more bores. One or more bores may extend along a length of one or more absorption materials. One or more absorption materials may have a size suitable for residing within one or more damper bores, one or more components of the mass damper, or both. One or more absorption materials may have a length smaller than, equal to, or larger than a length of one or more components of the mass damper, a damper bore, or both. For example, one or more absorption materials may be sized to fit within one or more chambers, about an exterior of a counter mass, within a damper bore, between one or more counter masses and one or more bore walls, or any combination thereof. When assembled as a component of mass damper, one or more absorption materials may be located within an interior and/or about an exterior of one or more other components of the mass damper. When assembled as a component of a mass damper, one or more absorption materials may be sealed within, adhered to, press-fit into, over-molded onto, and/or placed within one or more components of the mass damper, damper bore, or both. One or more absorption materials may expand upon compression. Expansion may refer to radial expansion, expansion away from a longitudinal axis, and/or expansion generally perpendicular to a longitudinal axis. Compression may refer to linear compression, compression parallel with a longitudinal axis, or both. Upon compression, one or more absorption materials may have an increased width. The width may be a cross-sectional width. The width may be measured generally perpendicular to a longitudinal axis. One or more absorption materials may include one or more damper materials.

The mass damper may be comprised of one or more damper materials. One or more materials may function to add additional weight to a caliper housing, affix one or more components to one or more other components of a mass damper and/or a caliper housing, transfer or prevent the transfer of vibrations and/or oscillations, hold one or more components of a mass damper static, or any combination therebetween. One or more components of the mass damper may be comprised of the same and/or differing damper materials as one or more other components of the mass damper. One or more damper materials may include any material capable of adding weight to the caliper housing, vibrating and/or oscillating, transferring and/or preventing transfer of vibrations to one or more components of the mass damper or caliper housing, hold one or more components of the mass damper steady, or any combination thereof. One or more damper materials may include one or more solids, liquids, or both. One or more damper materials may have a volumetric mass density less than, about equal to, or greater than one or more other damper materials, materials of a caliper housing, or both. For example, one or more counter masses may have a volumetric mass density greater than a volumetric mass density of one or more absorption materials, isolators, and a caliper housing. One or more damper materials may include one or more metals, metalloids, nonmetals, or a combination thereof. One or more metals may include steel, titanium, aluminum, lead, or any combination thereof. For example, one or more caps, one or more fasteners, or more counter masses, or any combination thereof may be comprised of one or more metals. One or more nonmetals may include one or more polymers, glass (e.g., silica), water, oil, carbon fiber, the like, or any combination thereof. One or more polymers may include one or more elastomeric materials. One or more elastomeric materials may include rubber, silicone, polyurethane, thermoplastics, or any combination thereof. One or more polymers may include one or more granules (e.g., sand, microspheres, etc.), one or more foamed materials, or both. For example, one or more isolators, one or more caps, one or more absorption materials, or any combination thereof may be comprised of one or more nonmetals.

The present disclosure generally provides for a brake assembly having the mass damper of the disclosure. The brake assembly may include a caliper housing to which the mass damper may be affixed to. The brake assembly may be used with almost any vehicle as discussed hereinbefore. Alternatively, the brake assembly and/or the caliper housing may be integrated into components used for manufacturing or other equipment requiring a brake. Components may include a lathe, winder for paper products or cloth, amusement park rides, turbines, wind turbines, or the like. However, the present disclosure may be found particularly suitable for use with passenger vehicles. Passenger vehicles may include a car, truck, sports utility vehicle, or the like. A brake assembly may be understood as a disc brake, drum brake, hydraulic brake, electronic brake, electromechanical brake, the like, or any combination thereof. The present disclosure may find particular use in a disc brake assembly. A disc brake assembly may include an opposed piston type disc brake. Exemplary disc brakes are disclosed in US Publication Nos. 2016/0208872, 2014/0158483; and U.S. patent application Ser. No. 15/399,319; all of which are expressly incorporated herein by reference for all purposes. Generally, a disc brake may include a rotor and a caliper housing.

The brake assembly may include a rotor. The rotor may slow down or stop rotation of a wheel and/or axle. The rotor may have a general disc shape. The rotor includes one or more surfaces which receive the braking force. The rotor includes opposing braking surfaces. The opposing braking surfaces may include an inner surface and an outer surface. The rotor may be solid, hollow, or a combination of both. The rotor may define a rotational axis.

The rotor may rotate about a rotational axis. The rotational axis may function to allow the rotor to rotate co-axially with a wheel and/or axle. The rotational axis may be co-axial with a rotational axis of a vehicle wheel and/or axle. The rotational axis may be generally parallel, perpendicular, or any angle therebetween relative to one or more interior surfaces of one or more bodies, opposing surfaces of the rotor, one or more planes of a caliper housing, actuation movement of one or more pistons, one or more axis of one or more piston bores, or any combination thereof. For example, the rotational axis may be generally perpendicular to opposing surfaces of the rotor, one or more interior surfaces of one or more bodies, or both. The rotational axis may be generally parallel with one or more axis of one or more piston bores, actuation movement of one or more pistons, or both.

A rotational axis may define a radial direction. The radial direction may function to define structural relationships of one or more portions of the caliper housing, brake assembly, or both. The radial direction may be generally parallel, perpendicular, or any angle therebetween relative to a rotational axis, one or more interior surfaces of one or more bodies, opposing surfaces of the rotor, one or more planes, or any combination thereof. The radial direction may be generally perpendicular to the rotational axis of the rotor. The radial direction may be generally parallel with one or more interior surfaces of one or more bodies, opposing surfaces of the rotor, or both. The radial direction may define a radial outward direction. A radial outward direction may be defined as a direction which follows away from the rotational axis of the rotor. The radial outward direction may follow away from the rotational axis in the radial direction. One or more portions of a caliper housing may be located radially outward from the rotational axis.

The present teachings relate to a caliper housing. The caliper housing may function to house one or more braking components. Exemplary braking components may include one or more piston bores, pistons, friction material, a rotor, brake fluid, or any combination thereof. The caliper housing may be a unitary housing (e.g., one-piece, monoblock) or a multi-piece housing. The caliper housing may include one or more mass dampers, one or more damper bores, one or more sides, one or more bridge structures, one or more reinforcing structures, one or more through-windows, one or more fasteners, one or more fastener bores, a rotor gap, or any combination thereof. One or more sides may be located on opposing sides of a rotor gap, a rotor, or both. The caliper housing may have opposing ends. The opposing ends may be ends of a caliper housing adjacent a perimeter surface of a rotor, parallel to a longitudinal plane, or both.

The caliper housing may include one or more damper bores. One or more damper bores may function to house one or more mass dampers, distribute the weight of one or mass dampers in the caliper housing, or both. One or more damper bores may be located anywhere within the caliper housing to distribute the weight of one or more mass dampers to reduce and/or prevent vibrations of the caliper housing. One or more damper bores may have a shape which is generally cylindrical, conical, cubical, spherical, prismed, or any combination thereof. One or more dampers bores may have substantially the same shape or a differing shape as one or more components of a mass damper. One or more damper bores may be located in one or more sides, a bridge structure, or both of a caliper housing One or more damper bores may partially or completely pass through one or more sides, a bridge structure, or both of a caliper housing. One or more damper bores may pass through, extend toward, extend past, and/or not extend beyond an exterior surface, interior, interior surface, a rotor, rotor gap or any combination thereof of the caliper housing. One or more damper bores may not extend beyond an interior surface to allow the caliper housing to maintain structural rigidity. One or more damper bores may extend about 0% or more, about 25% or more, or even about 50% or more over a width of a rotor gap. One or more damper bores may extend about 100% or less, about 90% or less, or even about 80% or less over a width of a rotor gap. One or more damper bores may be located radially outward from a rotor gap, a rotor, one or more mounting bores, one or more interior surfaces, one or more pistons, one or more piston bores, or any combination thereof. One or more damper bores may be located radially between one or more one or more reinforcing structures, opposing ends, piston portions, one or more ends/edges of a bridge structure, or any combination thereof. The damper bore may be formed by one or more bore walls. One or more bore walls may be formed in an interior of one or more sides, a bridge structure, or both of the caliper housing. One or more bore walls may be substantially smooth, grooved, threaded, notched, or any combination thereof. When a mass damper resides within one or more damper bores, one or more components of the mass damper may be free of contact or in direct contact with one or more bore walls. The one or more damper bores may have a perimeter and/or cross-sectional area smaller than, about equal to, or larger than one or more components of the mass damper. For example, a damper bore may have a diameter smaller than an outer diameter of a cap and/or an absorption material, so that the cap is compressed to be assembled into the damper bore and is retained via an interference or compression fit. For example, one or more counter masses may have an outer diameter smaller than a diameter of a damper bore so that counter mass when located within the damper bore is free of contact with one or more bore walls. One or more damper bores may include a longitudinal axis along a length. The longitudinal axis may be parallel and/or co-axial with one or more longitudinal axis of one or more mass dampers.

The caliper housing includes one or more sides. One or more sides may function to house one or more pistons, mount the caliper housing, partially enclose a rotor, seal in a fluid, or any combination thereof. One or more sides may be defined by one or more planes of the caliper housing, a rotor, a rotor gap, or any combination thereof. One or more sides may be located adjacent and/or opposing one or more surfaces of a rotor. An inboard side may be located adjacent and opposing an inner surface of a rotor. An outboard side may be located adjacent and opposing an outer surface of a rotor. One or more sides may include one or more piston bores, house one or more pistons, one or more bridge structures, one or more through-windows, one or more interior surfaces, one or more exterior surfaces, one or more fasteners, one or more fastener bores, one or more mounting bores, or any combination thereof. One or more interior surfaces may be defined as surfaces facing toward a rotor gap, rotor, having one or more piston bores, or any combination thereof. One or more interior surfaces may be opposing one or more other interior surfaces. For example, an interior surface of an inboard side may be distanced from and opposing an interior surface of an outboard side. One or more interior surfaces may be located radially inward from a bridge structure, one or more damper bores, or both. One or more interior surfaces may be located radially outward from one or more mounting bores.

The caliper housing may define one or more planes. One or more planes may function to describe the location of one or more portions of the caliper housing, brake assembly, or both relative to one or more other portions. One or more planes may include a longitudinal plane; a transverse plane; one or more planes perpendicular, parallel, or any angle therebetween relative to the longitudinal plane and/or transverse plane; or any combination thereof. One or more planes may be parallel, perpendicular, or any angle therebetween relative to one or more interior surfaces of one or more bodies, opposing surfaces of a rotor, a rotational axis, an axis of one or more pistons, a longitudinal axis of a mass damper, or any combination thereof. A longitudinal plane may intersect and/or be generally perpendicular with one or more bodies, interior surfaces of one or more bodies, a rotor, opposing surfaces of a rotor, a rotor gap, or any combination thereof. The longitudinal plane may be parallel with a rotational axis, an axis of one or more pistons, an axis of one or more damper bores, or any combination thereof. A transverse plane may be substantially perpendicular with one or more other planes. A transverse plane may be substantially perpendicular with the longitudinal plane. A transverse plane may be substantially parallel with one or more interior surfaces of one or more bodies, opposing surfaces of a rotor, or both. A transverse plane may lie within the rotor gap. A transverse plane may lie within a rotor between opposing surfaces, without passing through the opposing surfaces.

The caliper housing includes a rotor gap. The rotor gap functions to house a rotor. The rotor gap may be formed by a distance between opposing surfaces of a caliper housing. Opposing surfaces may include opposing interior surfaces. The interior surfaces may be interior surfaces of one or more sides. One or more sides may include an inboard side and an outboard side. The rotor gap has a width. The width may be measured as the distance between the inboard side and the outboard side. One or more piston bores may face toward the rotor gap. A bridge structure may be located radially outward from the rotor gap. The rotor gap may be in communication with an external environment via one or more portions of the bridge structure.

The caliper housing includes a bridge structure. The bridge structure may function to connect one or more sides of the caliper housing to one or more other sides of the caliper housing. The bridge structure may be located radially outward from one or more piston bores, an interior surface of a rotor, a rotor gap, or both. The bridge structure may be integral with or attached to one or more sides of a caliper housing. For example, in a monoblock caliper, the bridge structure may be integral with both an inboard side and outboard side of a caliper housing. For example, in a multi-piece caliper, the bridge structure may be integrally formed with the inboard side or the outboard side; affixed via a fastener to an inboard side or outboard side, or both. The bridge structure may extend from one or more sides to one or more other sides. The bridge structure may extend from an outboard side to an inboard side, or vice-versa. The bridge structure may extend over a rotor gap in a linear and/or arc-like fashion. The bridge structure may extend from one side to an opposing side of the caliper housing. The bridge structure may be located between opposing ends of the caliper housing. The bridge structure may include one or more reinforcing structures, one or more through-windows, one or more fastener bores, one or more fasteners, one or more damper bores, or any combination thereof.

The bridge structure may include one or more reinforcing structures. One or more reinforcing structures may include a single reinforcing structure or a plurality of reinforcing structures. One or more reinforcing structures may function to prevent displacement of one or more sides relative to one or more other sides. One or more reinforcing structures may include one or more ribs, one or more extensions, the like, or any combination thereof. One or more reinforcing structures may include one or more, two or more, or even four or more reinforcing structures. One or more reinforcing structures may include ten or less, eight or less, or even six or less reinforcing structures. One or more reinforcing structures may extend from one or more sides. One or more reinforcing structures may extend from an outboard side, an inboard side, or both. One or more reinforcing structures may extend from an exterior surface and/or an interior surface of one or more sides. One or more reinforcing structures may be integrally formed and/or affixed to one or more bodies. For example, one or more reinforcing structures may be integral with and extend from an exterior surface of an outboard side. One or more reinforcing structures may extend toward one or more sides, one or more planes, one or more other portions of a bridge structure, or any combination thereof. One or more reinforcing structures may extend toward an inboard side, an outboard side, a rotor gap, a rotor, a transverse plane, or any combination thereof. One or more reinforcing structures may extend partially or completely the distance from one or more sides to one or more other sides, over a rotor gap, or both. One or more reinforcing structures may extend only partially over a rotor gap. One or more reinforcing structures may be located radially outward from a rotor gap. One or more reinforcing structures may extend from an outboard side toward an inboard side, but may not extend completely toward the inboard side. One or more reinforcing structures may have or form one or more shapes generally resembling a V, X, W, H, I, the like, or any combination thereof. One or more reinforcing structures may converge or diverge from one or more other reinforcing structures. One or more reinforcing structures may include one or more damper bores passing partially or completely therethrough. One or more reinforcing structures may be distanced from one another to form through-windows in the bridge structure.

The caliper housing may include one or more through-windows. One or more through-windows may function to allow the rotor gap, rotor, and/or brake pads to be in communication with an ambient environment surrounding a brake assembly to allow for heat dissipation; allow for weight to be reduced from a bridge structure while a plurality of reinforcing structures provide sufficient structural support to prevent displacement; or any combination thereof. One or more through-windows may be located above (i.e., radially outward from) the rotor gap. One or more through-windows may be formed in one or more sides of a caliper housing, a bridge structure, or both. One or more through-windows may be formed by one or more reinforcing structures. For example, one or more through-windows may be formed by the space between two or reinforcing structures. One or more through-windows may be formed by an area enclosed by one or more surfaces of one or more portions of a bridge structure, one or more sides of a caliper housing, or any combination thereof. One or more through-windows may include one or more, two or more, or even three or more through-windows. One or more through-windows may include ten or less, eight or less, or even six or less through-windows.

The caliper housing may include one or more fasteners. One or more fasteners may include a single fastener or a plurality of fasteners. One or more fasteners may function to secure one or more sides of the caliper housing to one or more other sides, cooperate with one or more portions of a bridge structure and/or one or more sides to reinforce the caliper housing to prevent displacement, or any combination thereof. One or more fasteners may be any fastener capable of securing one or more sides to one or more other sides. One or more fasteners may include one or more fasteners described hereinbefore as a fastener suitable for a mass damper. One or more fasteners may include one or more fasteners as described in U.S. patent application Ser. No. 15/399,319.

The disclosure relates to a method of assembling one or more mass dampers according to the teachings herein. The present teachings may be performed in virtually any order. One or more features of the mass damper, caliper housing, and/or brake assembly taught herein may be provided. The method may include any or all of the following steps. Forming one or more components of a mass damper, caliper housing, or both. Forming may include machining from billet, casting, forging, cold heading, thread rolling, boring, molding, extruding, or any combination thereof. One or more absorption materials, isolators, and/or caps may be heat extruded, injection molded, and/or compression molded. One or more counter masses, fasteners, and/or caps may be casted, injection molded, thread rolled, and/or machined. One or more bores may be formed by drilling, molding, threading, and/or casting. Assembling one or more components of a mass damper to one or more other components of a mass damper. Assembling may include overmolding, compressing, inserting, threading, receiving, adhering, or any combination thereof. For example, one or more absorption materials may be over-molded over one or more counter masses, inserted and received within one or more counter masses, or both. For example, one or more fasteners may be threaded into one or more counter masses and/or bores, received within one or more bores, or both. Assembling one or more mass dampers to a caliper housing. Assembling may include assembling one or more mass dampers into a damper bore. Assembling may include filling, inserting, press-fitting, expanding, threading, adhering, or any combination thereof. For example, a mass damper may be press-fit into a damper bore so that one or more absorption materials are compressed and an interference fit is created between one or more absorption materials and one or more bore walls. For example, one or more absorption materials may be compressed along a length and expand along a width by one or more fasteners, so that upon expansion an interference fit is created between one more absorption materials and one or more bore walls.

Illustrative Embodiments

FIG. 1 illustrates a caliper housing 100. The caliper housing 100 is a unitary structure having an inboard side 112 opposing an outboard side 114. The inboard side 112 is connected to the outboard side 114 via a bridge structure 116. The bridge structure 116 extends from both the inboard side 112 and the outboard side 114 and over a rotor gap 118. A transverse plane $P_T$ passes through the rotor gap 118 between the inboard side 112 and the outboard side 114. When the caliper housing 100 is part of a brake assembly (not shown), a rotor 200 (not shown) is located within the rotor gap 118. The bridge structure 116 includes two reinforcing ribs 120 which diverge from the outboard side 114 to the inboard side 112. Between the two reinforcing ribs 120 there is a through-window 121 which exposes the rotor gap 118. The inboard side 112 includes two bridge bores 122. The bridge bores 122 extend from the inboard side 112 through the bridge structure 116 into the outboard side 114. The bridge bores 122 each include a bridge fastener 124 therethrough. The caliper housing 100 includes a damper bore 130. The damper bore 130 extends partially through the caliper housing 100. A mass damper 10 is secured within the damper bore 130.

Figure 2:
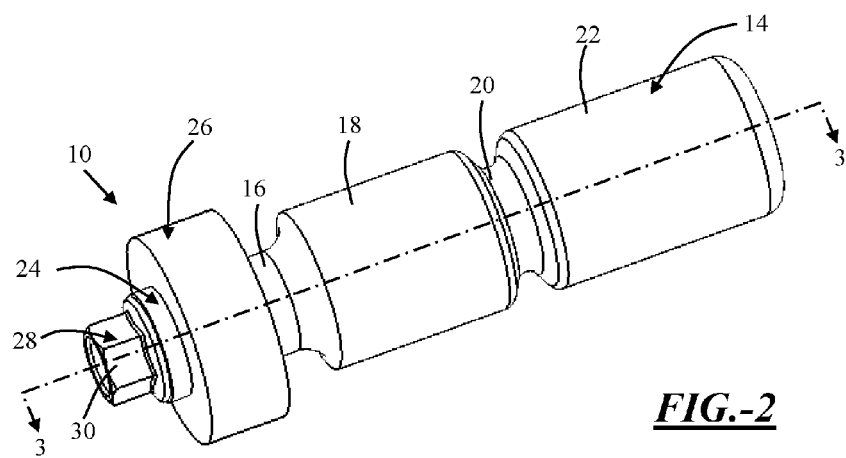
FIG. 2 is a perspective view of a mass damper.

FIG. 2 illustrates a mass damper 10. The mass damper 10 includes a counter mass 14. The counter mass 14 includes a neck portion 16. The neck portion 16 is narrower and integral with a first body portion 18. The first body portion 18 narrows into a midsection 20 which is then integral with a second body portion 22. The midsection 20 is narrower than the first and second body portions 18, 22 giving the counter mass 14 an hour-glass like shape. An isolator 24 is located adjacent to the neck portion 16. A cap 26 encircles about at least a portion of a length of both the isolator 24 and the neck portion 16. The mass damper 10 further includes a damper fastener 28. The damper fastener 28 includes both a head 30 and a shaft 32 (not shown). The shaft 32 (not shown) extends through the isolator 24 into the counter mass 14 such that the head 30 is adjacent to and rests on the isolator 24. The damper fastener 28 retains the isolator 24, cap 26, and counter mass 14 assembled together.

Figure 3:
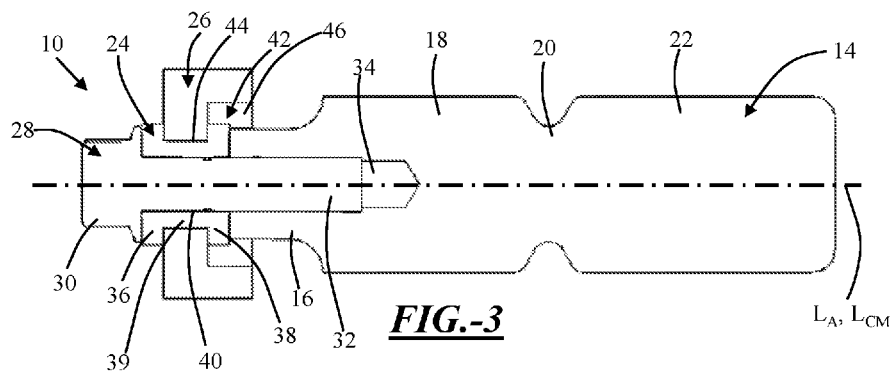
FIG. 3 illustrates a cross-section of a mass damper of FIG. 2 along lines 3-3.
Figure 4:
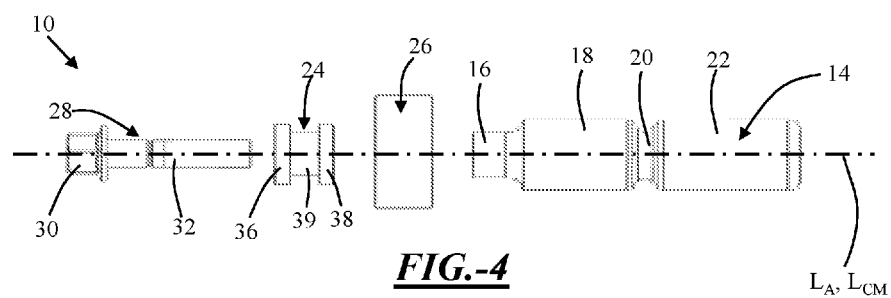
FIG. 4 is an exploded view of a mass damper.

FIG. 3 illustrates a cross-section of mass damper 10 and FIG. 4 illustrates an exploded view of mass damper 10. The mass damper 10 includes a counter mass 14. The counter mass 14 (as shown) is a solid unitary structure with a fastener bore 34 extending from the neck portion 16 into the first body portion 18. The fastener bore 34 is concentric with a longitudinal axis $L_{CM}$ of the counter mass 14, which is coaxial with the longitudinal axis $L_A$ of the mass damper 10. An isolator 24 is located adjacent to and concentric with the neck portion 16. The isolator 24 has a bobbin-like cylindrical shape with differing widths. The isolator 24 includes a head portion 36 distanced from a tail portion 38 by a middle portion 39. The head portion 36 is approximately the same width as the tail portion 38 and wider than the middle portion 39. The tail portion 38 has substantially the same width as the neck portion 16 of the mass damper. The tail portion 38 is adjacent to the neck portion 16. The isolator 24 also includes a fastener bore 40 extending from the head portion 36 through the tail portion 38. The fastener bore 40 has approximately the same width as the fastener bore 34 of the counter mass 14. The fastener bore 40 of the isolator 24 is concentric with the fastener bore 34 of the counter mass 14. Surrounding the isolator 24 and the neck portion 16 is a cap 26. The cap 26 is concentric with both the isolator 24 and the counter mass 14. The cap 26 has an exterior width larger than any width of the isolator 24 or counter mass 14. The cap 26 is engaged with the isolator 24. The cap 26 includes an isolator bore 42 having varying widths. The isolator bore 42 includes isolator bore portion 44 and a counter mass bore portion 46. The isolator bore portion 44 has a smaller width than the counter mass bore portion 46. The isolator bore portion 44 has a width smaller than the width of the head portion 36 and tail portion 38 and about equal to or larger than the middle portion 39. The isolator bore portion 44 is received about the isolator 24 between the head portion 36 and tail portion 38 so that the cap 26 is interlocked with isolator 24. Adjacent to the isolator bore portion 44 is the counter mass bore portion 46. The counter mass bore portion 46 surrounds the tail portion 38 of the isolator 24 and part of the length of the neck portion 16 of the counter mass 14. The counter mass bore portion 46 has a width larger than the tail portion 38 and neck portion 16 to prevent contact of the counter mass 14 with the cap 26. The mass damper 14 further includes a damper fastener 28. The damper fastener 28 includes a head 30 and a shaft 32. The shaft 32 passes through the fastener bores 34, 40 of the isolator 24 and counter mass 14. The shaft 32 and one or both fastener bores 34, 40 may have threads (not shown) so that the shaft 32 may engage with one or both of the fastener bores 34, 40. The damper fastener 28 connects the isolator 24 to the counter mass 14 by compressing the isolator 24 between the head 30 and the neck portion 16.

Figure 5:
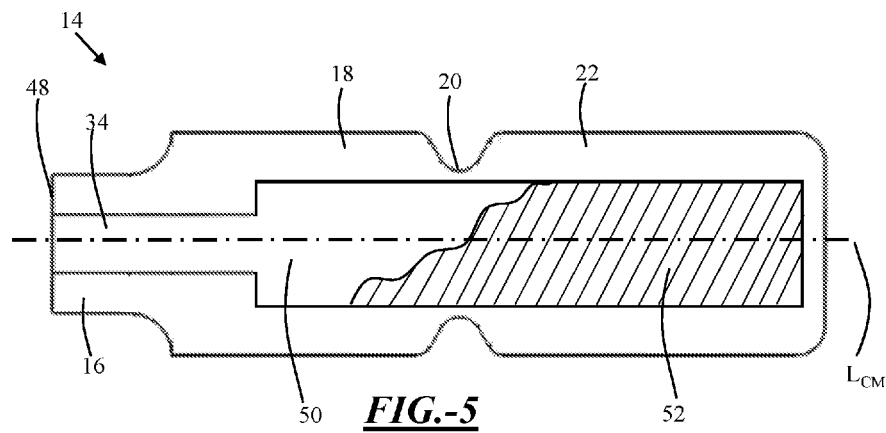
FIG. 5 illustrates a cross-section of a counter mass of a mass damper.

FIG. 5 illustrates a cross-section of a counter mass 14 taken along a plane which intersects the longitudinal axis $L_{CM}$ of the counter mass 14. The counter mass 14 includes a neck portion 16 which widens into a first body portion 18. The first body portion 18 narrows into a midsection 20. The midsection 20 then widens into a second body portion 22. A fastener bore 34 is formed in a receiving end 48 of the counter mass 14. The fastener bore 34 is configured to receive a damper fastener 28 (not shown). The fastener bore 34 extends from the receiving end 48 through the neck portion 16. The fastener bore 34 extends from the neck portion 16 into the first body portion 18. The fastener bore 34 expands into a chamber 50 within the counter mass 14. The chamber 50 is formed through part of the first body portion 18, the midsection 20, and the second body portion 22. Located within the chamber 50 is an absorption material 52. The chamber 50 is only partially filled with the absorption material 52.

Figure 6:
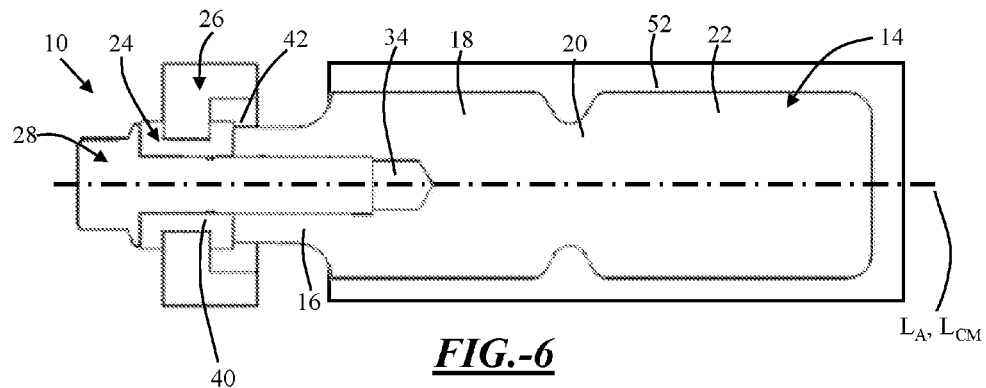
FIG. 6 illustrates a cross-section of a mass damper having an absorption material partially surrounding a counter mass.

FIG. 6 illustrates a cross-section of mass damper 10 taken along a plane which intersects the longitudinal axis $L_A$ of the mass damper 10. The mass damper 10 includes a counter mass 14. The counter mass 14 includes a neck portion 16, first body portion 18, midsection 20, and a second body portion 22. An absorption material 52 surrounds a portion of the counter mass 14. The absorption material 52 may be over molded over the counter mass 14. The counter mass 14 (as shown) is a solid unitary structure with a fastener bore 34 extending from a neck portion 16 into a first body portion 18. An isolator 24 is located adjacent to and concentric with the neck portion 16. The isolator 24 also includes a fastener bore 40. The fastener bore 40 of the isolator 24 is concentric with the fastener bore of the counter mass 14. Surrounding the isolator 24 and the neck portion 16 is a cap 26. The cap 26 is concentric with both the isolator 24 and the counter mass 14. The cap 26 includes an isolator bore 42 having varying widths. The mass damper 14 further includes a damper fastener 28.

Figure 7:
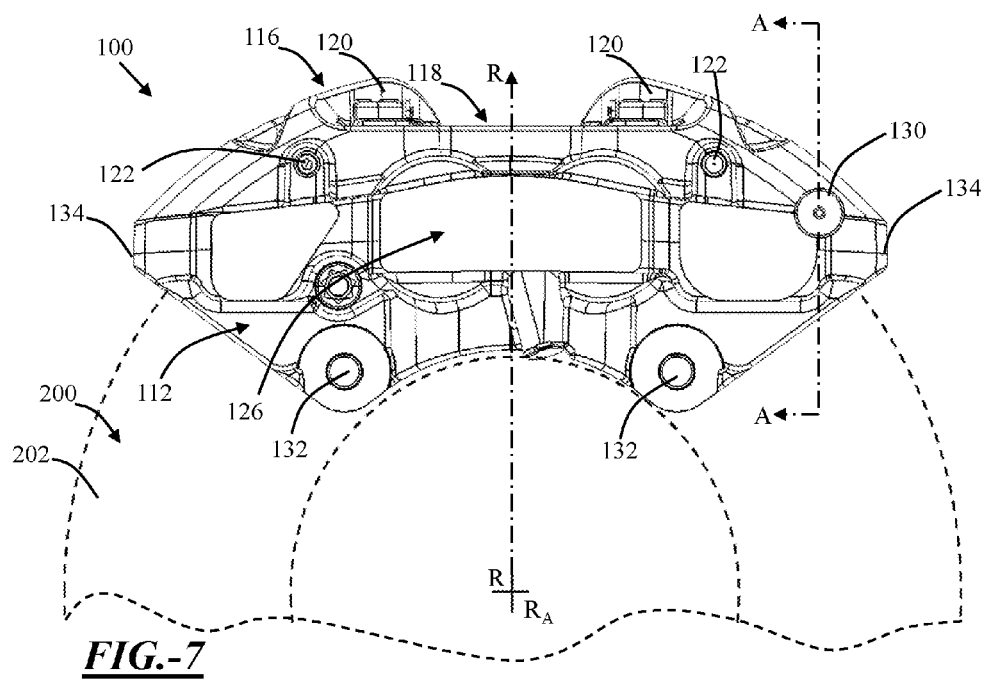
FIG. 7 is a plan view of a caliper housing having a mass damper.

FIG. 7 illustrates a plan view of a caliper housing 100. The caliper housing 100 includes an inboard side 112 which connects to an outboard side 114 (not shown) via a bridge structure 116. The bridge structure 116 includes two reinforcing ribs 120. The reinforcing ribs 120 converge toward each other as the reinforcing ribs extend from the inboard side 112 toward the outboard side 114 (not shown). The inboard side 112 includes an exterior surface 126. Opposite the exterior surface 126 is an interior surface 128 (not shown). The interior surface 128 (not shown) faces toward an inner surface 202 of a rotor 200. The rotor 200 resides within a rotor gap 118. The rotor 200 rotates about a rotational axis $R_A$. The rotational axis $R_A$ is substantially orthogonal to the interior surface 128 (not shown) of the inboard side 112. The rotor 200 defines a radial direction R-R which is perpendicular to the rotational axis $R_A$. A radially outward direction is defined when the radial direction R-R is followed away from the rotational axis $R_A$. The inboard side 112 includes mounting bores 132 radially inward from the bridge structure 116. The two reinforcing ribs 120 are radially outward from two bridge bores 122 of the caliper housing 100. A damper bore 130 is located radially outward from the mounting bores 132. The caliper housing 100 has two opposing ends 134. The damper bore 130 is located radially between one of the reinforcing ribs 120 and an end 134 of the caliper housing 134. The damper bore 130 is located in the exterior surface 126 of the inboard side 112 and extends into the inboard side 112 and in to the bridge structure 116.

Figure 8:
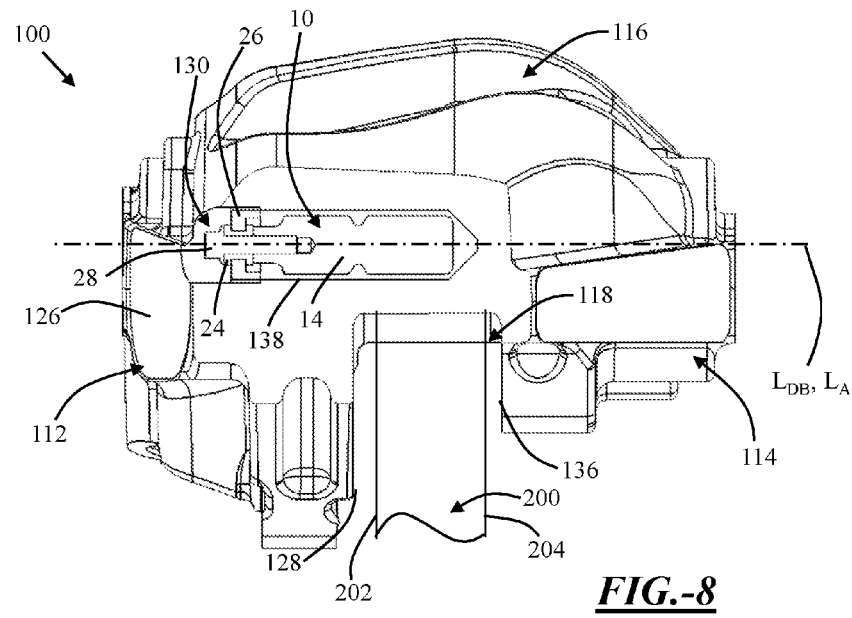
FIG. 8 illustrates a cross-section of a caliper housing taken along cut-line A-A as shown in FIG. 7.

FIG. 8 illustrates a cross-section of caliper housing 100 taken along cut-line A-A as shown in FIG. 7. The caliper housing 100 includes an inboard side 112 and an outboard side 114. The inboard side 112 include an exterior surface 126 opposing an interior surface 128. The interior surface 128 faces toward a rotor gap 118. The rotor gap 118 is located between the inboard side 112 and the outboard side 114. The rotor gap 118 is formed by a distance between an interior surface 128 of the inboard side 112 and an interior surface 136 of the outboard side 114. A bridge structure 116 cantilevers from both the inboard side 112 and the outboard side 114 over the rotor gap 118. Located within the rotor gap 118 is a rotor 200. The rotor 200 includes an inner surface 202 opposing an outer surface 204. The interior surface 128 of the inboard side 112 faces toward the inner surface 202. The interior surface 136 of the outboard side 114 faces toward the outer surface 204. The caliper housing 100 includes a damper bore 130. The damper bore 130 passes from an exterior surface 126 of the caliper housing 100 into the caliper housing 100. The damper bore 130 extends past the interior surface 128 of the inboard side 112. The damper bore 130 passes into and partially through the bridge structure 116, partially past the rotor gap 118. The damper bore 130 extends toward the interior surface 136 of the outboard side 114. The damper bore 130 does not extend beyond the interior surface 136 of the outboard side 114. The damper bore 130 includes a bore wall 138. The bore wall 138 is substantially smooth. Residing with the damper bore 130 is a mass damper 10. The longitudinal axis $L_A$ of the mass damper 10 is substantially coaxial with a longitudinal axis $L_{DB}$ of the damper bore 130. The mass damper 10 includes a counter mass 14. The counter mass 14 floats within the damper bore 130. The counter mass 14 is free of contact with the bore wall 138. The mass damper 10 includes a cap 26. The cap 26 is interlocked within the damper bore 130 via an interference fit. To achieve the interference fit, the cap 26 has an exterior width larger than a width of the damper bore 130 prior to being inserted into the damper bore 130. The cap 26 is connected to the counter mass 14 via an isolator 24. The isolator 24 is attached to the counter mass 14 with a damper fastener 28.

Figure 9:
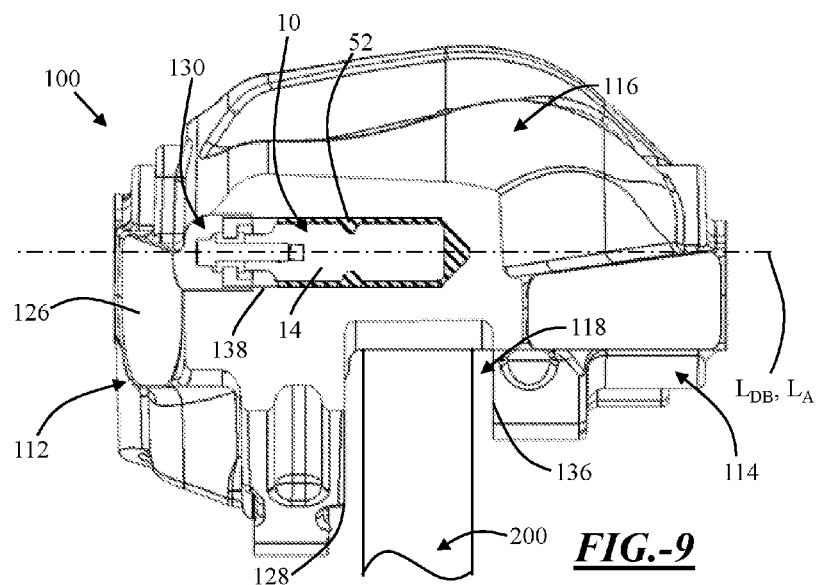
FIG. 9 illustrates a cross-section of a caliper housing taken along cut-line A-A as shown in FIG. 7, having an absorption material within a damper bore.

FIG. 9 illustrates a cross-section of caliper housing 100 taken along cut-line A-A as shown in FIG. 7. The caliper housing 100 includes an inboard side 112 and an outboard side 114. The caliper housing 100 includes a damper bore 130. The damper bore 130 passes from an exterior surface 126 of the caliper housing 100 into the caliper housing 100. The damper bore 130 extends past the interior surface 128 of the inboard side 112. The damper bore 130 passes into and partially through the bridge structure 116, partially past a rotor gap 118. The damper bore 130 extends toward the interior surface 136 of the outboard side 114. The damper bore 130 does not extend beyond the interior surface 136 of the outboard side 114. The damper bore 130 includes a bore wall 138. Residing with the damper bore 130 is a mass damper 10. The longitudinal axis $L_A$ of the mass damper 10 is substantially coaxial with a longitudinal axis $L_{DB}$ of the damper bore 130. The mass damper 10 includes a counter mass 14. Between the counter mass 14 and the bore wall 138 is an absorption material 52. The absorption material 52 prevents direct contact between the counter mass 14 and the bore wall 138.

Figure 10:
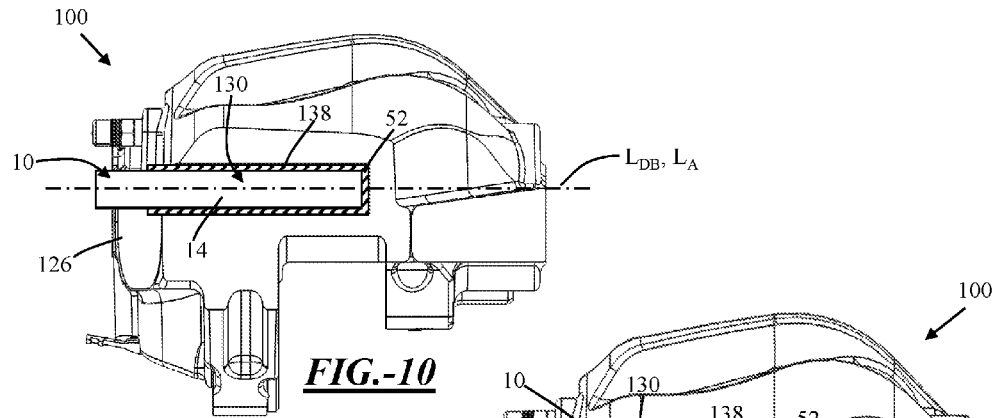
FIG. 10 illustrates a cross-section of a caliper housing taken along a longitudinal axis of a damper bore having a mass damper therein.

FIG. 10 illustrates a cross-section of caliper housing 100 taken along a longitudinal axis $L_A$ of a mass damper 10. The mass damper 10 resides within a damper bore 130. The mass damper 10 includes a counter mass 14. The counter mass 14 protrudes beyond an exterior surface 126 of the caliper housing 100. The counter mass 14 is over-molded with an absorption material 52. The absorption material 52 prevents the counter mass 14 from having direct contact with a bore wall 138 of the damper bore 130. The mass damper 10 is inserted via a press-fit into the damper bore 130. The mass damper 10 is retained within the damper bore 130 via an interference fit between the absorption material 52 and the bore wall 138.

Figure 11:
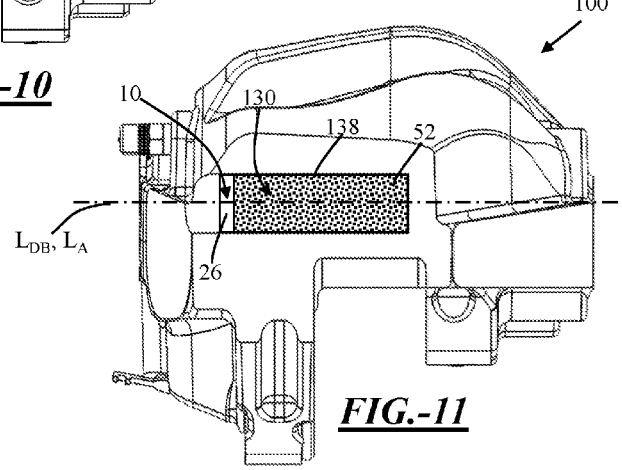
FIG. 11 illustrates a cross-section of a caliper housing taken along a longitudinal axis of a damper bore having a mass damper therein.

FIG. 11 illustrates a cross-section of caliper housing 100 taken along a longitudinal axis $L_{DB}$ of a damper bore 130. The damper bore 130 includes a mass damper 10 residing within. The mass damper 10 includes an absorption material 52 and a cap 26. The absorption material 52 partially fills the damper bore 130. The absorption material 52 is sealed into the damper bore 130 via the cap 26. The cap 26 is affixed to the bore wall 138. For example, the cap 26 may be threaded, adhered via an adhesive, press-fit, or the like to the bore wall 138.

Figure 12:
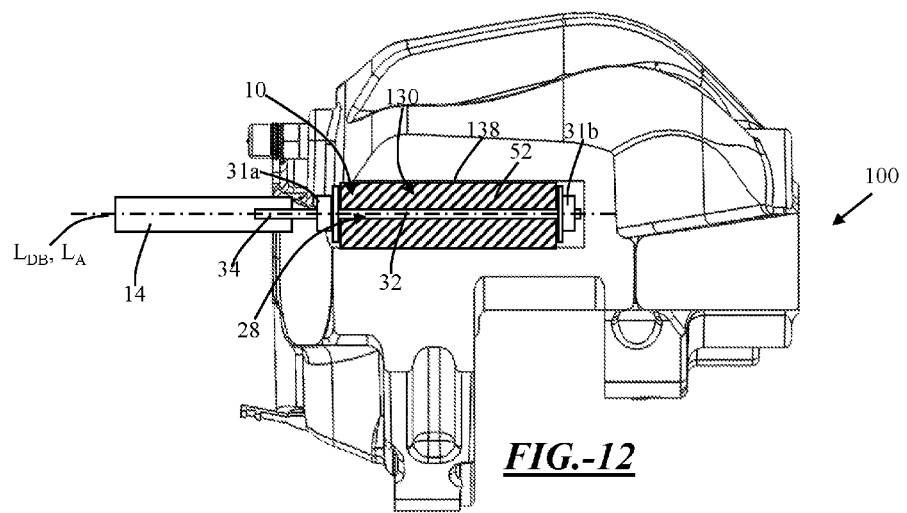
FIG. 12 illustrates a cross-section of a caliper housing taken along a longitudinal axis of a damper bore having a mass damper therein.

FIG. 12 illustrates a cross-section of a caliper housing 100 taken along a longitudinal axis $L_{DB}$ of a damper bore 130. Within the damper bore 130 is a mass damper 10. The mass damper 10 includes a damper fastener 28. The damper fastener 28 includes a shaft 32. The shaft 32 may be threaded. The shaft 32 is generally co-axial with the longitudinal axis $L_{DB}$. Engaged with the shaft 32 is a pair of opposing nuts 31. The opposing nuts 31 include an outer nut 31a and an inner nut 31b. The nuts 31 may include threads within an interior. Between the nuts 31 and about the shaft 32 is an absorption material 52. The mass damper 10 is retained within the damper bore 130 via an interference fit between the absorption material 52 and the bore wall 138. The absorption material 52 is expanded to form the interference fit. The absorption material 52 is expanded by being compressed between the pair of nuts 31. To compress the absorption material 52, the outer nut 31a is moved axially along the shaft 32 and toward the inner nut 31b until the absorption material 52 is sufficiently expanded (i.e., radially expanded) to form an interference fit with the bore wall 138. The shaft 32 is further engaged with a counter mass 14. The shaft 32 is engaged within a fastener bore 34 of the counter mass 14. The counter mass 14 is located opposite the absorption material 52, outside of the caliper housing 100.

Figure 13:
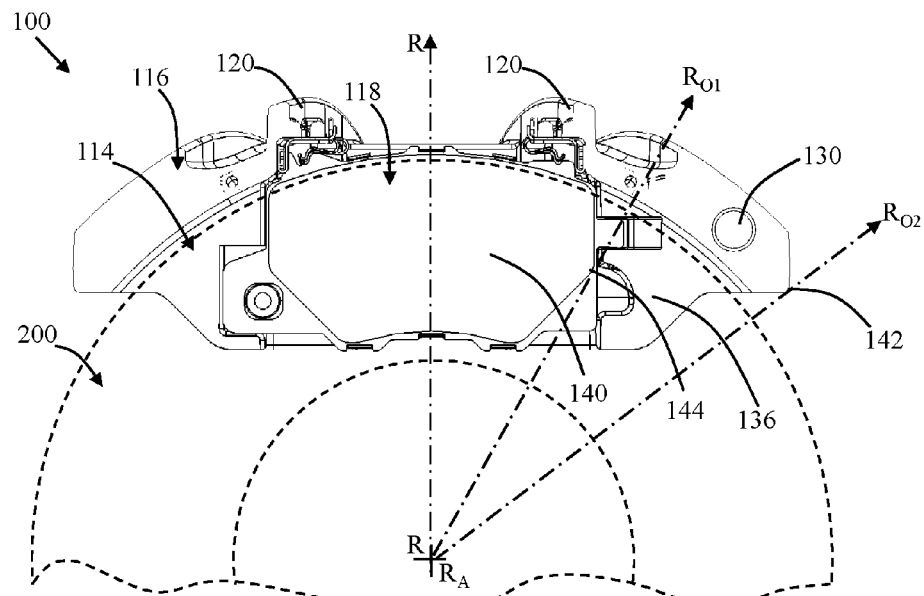
FIG. 13 illustrates a cross-section of a caliper housing taken along the transverse plane as shown in FIG. 1

FIG. 13 illustrates a cross-section of caliper housing 100 taken along a transverse plane $P_T$ (as shown in FIG. 1). The caliper housing 100 includes an outboard side 114 integral with an inboard side 112 (not shown). The outboard side 114 includes interior surface 136. The interior surface 136 may include an outer piston portion 140. The outer piston portion 140 may include one or more bores (not shown) and one or more outer brake pistons (not shown). The interior surface 136 faces toward an outer surface 204 (not shown) of a rotor 200. The rotor 200 rotates about a rotational axis $R_A$. The rotational axis $R_A$ is substantially orthogonal to the interior surface 136 of the outboard side 114. The rotor 200 defines a radial direction R-R which is perpendicular to the rotational axis $R_A$. A radially outward direction is defined when the radial direction R-R is followed away from the rotational axis $R_A$. The interior surface 136 is located radially inward from a bridge structure 116. The bridge structure 116 includes two reinforcing ribs 120. A damper bore 130 is formed within the bridge structure 116. The damper bore 130 is located radially outward from the interior surface 136 of the outboard side 114. The damper bore 130 is located radially between a reinforcing rib 120 and an outer edge 142 of the bridge structure 116. A first radially outward direction $R_{O1}$ is defined where the radially outward direction is tangent to an outer edge 144 of the outer piston portion 140. A second radially outward direction $R_{O2}$ is defined where the radially outward direction is substantially tangent to the outer edge 142 of the bridge structure 116. The damper bore 130 is located radially between the first and second radially outward directions $R_{O1}$ and $R_{O2}$.

Figure 14:
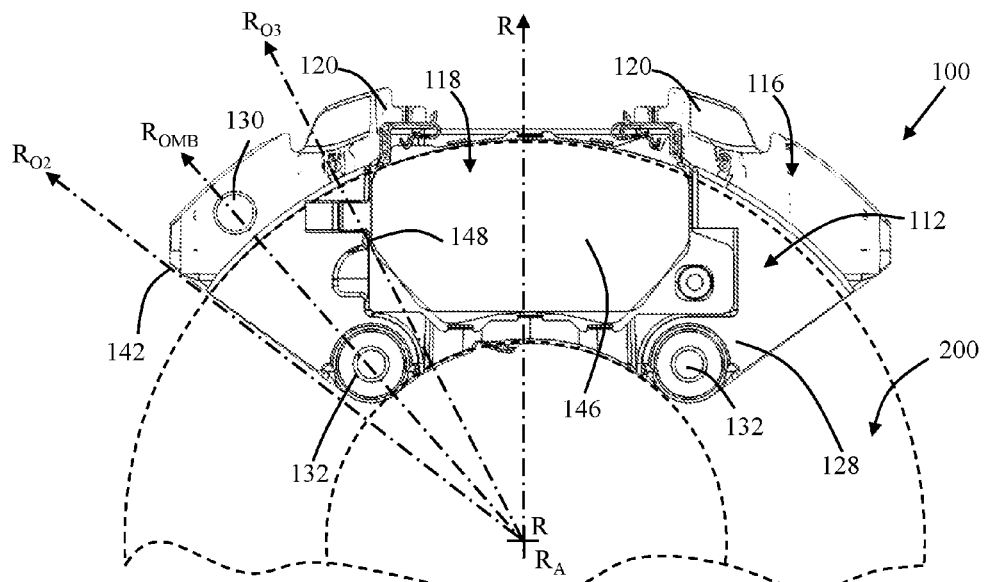
FIG. 14 illustrates a cross-section of a caliper housing taken along the transverse plane as shown in FIG. 1

FIG. 14 illustrates a cross-section of caliper housing 100 taken along a transverse plane $P_T$ (as shown in FIG. 1). The caliper housing 100 includes an inboard side 112 integral with an outboard side 114 (not shown). The inboard side 112 includes interior surface 128. The interior surface 128 may include an inner piston portion 146. The inner piston portion 146 may include one or more bores (not shown) and one or more inner brake pistons (not shown). The interior surface 128 faces toward an inner surface 202 (not shown) of a rotor 200. The rotor 200 rotates about a rotational axis $R_A$. The rotational axis $R_A$ is substantially orthogonal to the interior surface 128 of the inboard side 112. The rotor 200 defines a radial direction R-R which is perpendicular to the rotational axis $R_A$. A radially outward direction is defined when the radial direction R-R is followed away from the rotational axis $R_A$. The interior surface 128 is located radially inward from a bridge structure 116. The bridge structure 116 includes two reinforcing ribs 120. A damper bore 130 is formed within the bridge structure 116. The damper bore 130 is located radially outward from the interior surface 128 of the inboard side 112. The damper bore 130 is located radially between a reinforcing rib 120 and an outer edge 142 of the bridge structure 116. A third radially outward direction $R_{O3}$ is defined where the radially outward direction is tangent to an outer edge 148 of the inner piston portion 146. A second radially outward direction $R_{O2}$ is defined where the radially outward direction is substantially tangent to the outer edge 142 of the bridge structure 116. The damper bore 130 is located radially between the second and third radially outward directions $R_{O2}$ and $R_{O3}$. The inboard side 112 includes two mounting bores 132. The mounting bores 132 are located radially inward from the inner piston portion 146. At least a portion of the damper bore 130 is radially outward and radially aligned with at least a portion of a mounting bore 132, shown by radially outward line $R_{OMB}$.

REFERENCE NUMERAL LISTING

10 Mass damper
14 Counter mass
16 Neck portion of counter mass
18 First body portion of counter mass
20 Midsection of counter mass
22 Second body portion of counter mass 24 Isolator
26 Cap
28 Damper fastener
30 Head of damper fastener
31 Nut of damper fastener
32 Shaft of damper fastener
31a Outer nut of damper fastener
31b Inner nut of damper fastener
34 Fastener bore of counter mass
36 Head portion of isolator
38 Tail portion of isolator
39 Middle portion of isolator
40 Fastener bore of isolator
42 Isolator bore
44 Isolator bore portion
46 Counter mass bore portion
48 Receiving end
50 Chamber in counter mass
52 Absorption filling in counter mass
100 Caliper housing
112 Inboard side
114 Outboard side
116 Bridge structure
118 Rotor gap
120 Reinforcing rib
122 Bridge bore
124 Bridge fastener
126 Exterior surface of inboard side
128 Interior surface of inboard side
130 Damper bore
132 Mounting bores
134 Ends of caliper housing
136 Interior surface of outboard side
138 Bore wall of damper bore
140 Outer piston portion
142 Outer edge of bridge structure
144 Outer edge of outer piston portion
146 Inner piston portion
148 Outer edge of inner piston portion
200 Rotor
202 Inner surface of rotor
204 Outer surface of rotor
$L_A$ Longitudinal axis of mass damper
$L_{CM}$ Longitudinal axis of counter mass
$P_T$ Transverse plane
$R_A$ Rotational Axis
$R_{O1}$ First radially outward direction
$R_{O2}$ Second radially outward direction As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition." Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for aid purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A caliper housing comprising:
   a) an inboard side;
   b) an outboard side distanced from the inboard side so that a rotor gap is formed between the inboard side and the outboard side;
   c) a bridge structure which extends from both the inboard side and the outboard side over the rotor gap and connects the inboard side with the outboard side;
   d) a damper bore passing through the caliper housing from the inboard side into the bridge structure; and
   e) a mass damper resiliently supported within the damper bore; and
wherein the mass damper is adapted to dampen vibrations occurring during use of the caliper housing.

2. The caliper housing of claim 1, wherein the mass damper does not extend past the rotor gap into the outboard side.

3. The caliper housing of claim 1, wherein a rotor resides within the rotor gap and includes a rotational axis; and
wherein the damper bore includes a longitudinal axis parallel with the rotational axis.

4. The caliper housing of claim 1, wherein the damper bore is located radially outward from the rotor gap and extends through the bridge structure toward the outboard side.

5. The caliper housing of claim 1, wherein the damper bore is located radially between a rib of the bridge structure and an outer edge of the bridge structure.

6. The caliper housing of claim 1, wherein the inboard side, the bridge structure, and the outboard side are a unitary structure.

7. The caliper housing of claim 1, wherein the mass damper includes a counter mass which resides within and/or is affixed to the damper bore.

8. The caliper housing of claim 7, wherein the mass damper is adapted to dampen vibration frequencies of the caliper housing from about 0 kHz to about 14 kHz.

9. The caliper housing of claim 8, wherein the counter mass is comprised of one or more metals, one or more polymers, or both.

10. The caliper housing of claim 8, wherein the counter mass includes an absorption material, is at least partially surrounded by the absorption material, the absorption material is located between a bore wall of the damper bore and the counter mass, or any combination thereof.

11. The caliper housing of claim 10, wherein the absorption material includes an elastomeric material.

12. The caliper housing of claim 10, wherein the absorption material has an interference fit with the bore wall so that the mass damper is press-fit into the damper bore.

13. The caliper housing of claim 10, wherein the counter mass is free of contact with the bore wall.

14. The caliper housing of claim 10, wherein the mass damper includes a cap to secure the mass damper to the damper bore and the cap is affixed within the damper bore via an interference fit, a threaded fit, an adhesive, or any combination thereof.

15. The caliper housing of claim 14, wherein the cap has a width larger than an entire width of the counter mass so that the counter mass is free of contact with the bore wall of the damper bore.

16. The caliper housing of claim 15, wherein an isolator is affixed to both the counter mass and the cap and isolates the counter mass from the cap.

17. The caliper housing of claim 16, wherein the counter mass and the isolator receive a fastener therein to affix the isolator to the counter mass; and wherein the isolator is compressed between a portion of the fastener and the counter mass.

18. The caliper housing of claim 1, wherein the mass damper does not protrude beyond any exterior surface of the inboard side and the outboard side.

19. A brake assembly comprising:
a) a rotor having a rotational axis; and
b) a caliper housing having:
(i) an inboard side;
(ii) an outboard side distanced from the inboard side so that a rotor gap is formed between the inboard side and the outboard side;
(iii) a bridge structure which extends from both the inboard side and the outboard side over the rotor gap and connects the inboard side with the outboard side;
(iv) a damper bore passing through the caliper housing from the inboard side into the bridge structure toward the outboard side; and
(v) a mass damper residing within the damper bore, wherein the mass damper includes:
a counter mass which is free of contact with a bore wall of the damper bore; and
one or more absorption materials; and
wherein the mass damper is adapted to dampen vibrations occurring during use of the caliper housing.

20. The brake assembly of claim 19, wherein the one or more absorption materials at least partially surround the counter mass; and
wherein the absorption material has an interference fit with the bore wall so that the mass damper is press-fit into the damper bore.

* * * * *